United States Patent [19]

Marceau

[11] Patent Number: 4,520,563
[45] Date of Patent: Jun. 4, 1985

[54] CHAIN SAW EXTENSION ATTACHMENT

[76] Inventor: Aurilien J. Marceau, 221 S. Johnston, Box 49, Kenney, Ill. 61479

[21] Appl. No.: 588,338

[22] Filed: Mar. 12, 1984

[51] Int. Cl.³ .................... B27B 17/02; B27B 19/00
[52] U.S. Cl. .................................. 30/122; 30/394; 30/166 A; 144/35 A
[58] Field of Search ............... 30/122, 392, 393, 394, 30/166 R, 166 A; 144/35 A

[56] References Cited

U.S. PATENT DOCUMENTS

| | | | |
|---|---|---|---|
| 1,004,245 | 9/1911 | Crouch | 30/385 |
| 1,793,053 | 2/1931 | Cahill et al. | 144/35 A |
| 2,532,981 | 12/1950 | Wolfe | 30/385 |
| 2,726,689 | 12/1955 | Busby | 144/35 A |
| 2,881,519 | 4/1959 | Gardner | 30/122 |
| 3,279,508 | 10/1966 | Ehlen et al. | 30/385 |
| 3,291,167 | 12/1966 | Varden | 30/122 |
| 3,340,612 | 9/1967 | Knight | 30/394 |
| 3,533,456 | 10/1970 | Hovhannesian | 144/35 A |
| 4,048,722 | 9/1977 | Howard | 30/122 |
| 4,223,462 | 9/1980 | Morris | 30/383 |
| 4,361,960 | 12/1982 | Halverson | 30/385 |

Primary Examiner—Jimmy C. Peters
Attorney, Agent, or Firm—Walter Leuca; Richard G. Kinney

[57] ABSTRACT

A reciprocating saw attachment for a chain saw whereby the rotating chain saw drive converts the attachment to reciprocating movement to operate a saw blade longitudinally remote from the chain saw tool. It comprises a guide bar having one end formed to replace the prior art guide bar. The guide bar of this invention is formed with a slotted aperture in the body thereof and carries a sprocket wheel at the distal end of the guide bar. An endless link chain encircles the edge of the guide bar, the sprocket drive of the chain saw motor and the sprocket wheel mounted on the guide bar. A slide block is reciprocally movable in the slotted aperture and driven by a crank lever connecting the sprocket wheel and the slide block. A longitudinal pole is mounted on the guide bar for distally supporting an elongated push rod mounted on the guide bar for reciprocal movement. The proximate end of the elongated push rod is linked to the slide block. Bracket means is mounted adjacent the distal end of the elongated pole and serves to support the distal end of the elongated push rod. A saw blade is connected to the distal end of the push rod and extends longitudinally thereof.

14 Claims, 12 Drawing Figures

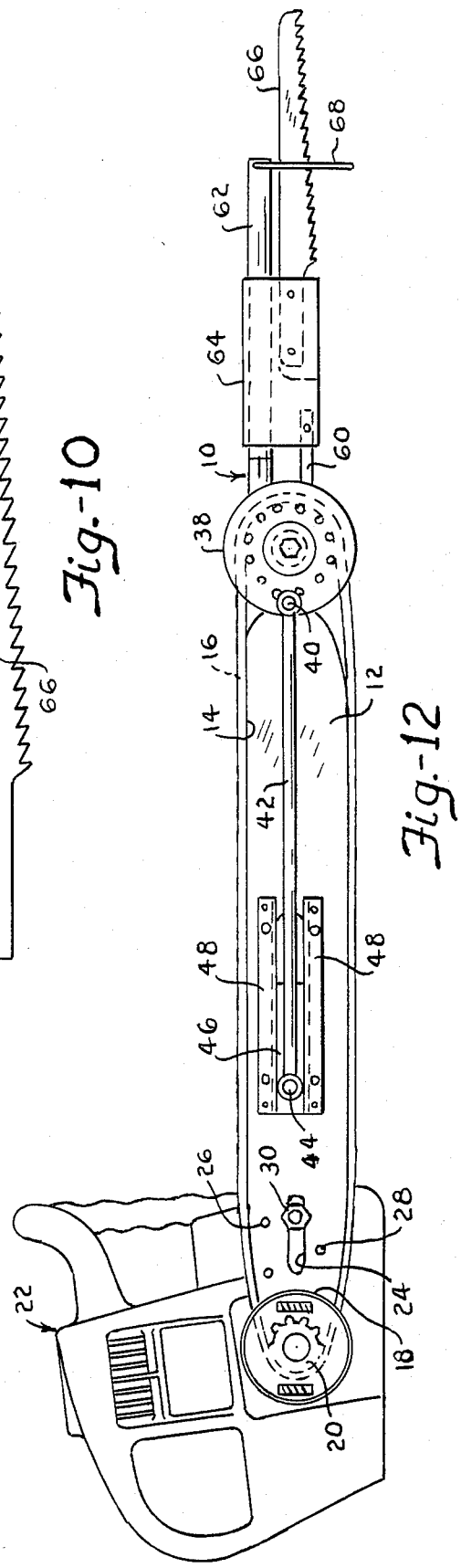

4,520,563

CHAIN SAW EXTENSION ATTACHMENT

BACKGROUND OF THE INVENTION

1. Field of the Invention

This invention relates generally to chain saws and more particularly to an extension attachment for chain saw drives.

2. Description of the Prior Art

Prior art chain saws comprise a hand held motor driven tool which includes a clutch operated sprocket which drives an endless chain saw around a longitudinally oblong metal plate, the edge of which serves as a track for the traveling saw. The longitudinal length of the oblong plate is generally between 8 and 18 inches, most being between 10 and 14 inches for home use and those exceeding 14 or 16 inches being for professional use. Accordingly most of the chain saws manufactured and sold are the smaller type. Therefore, the use of such chain saws are limited to cutting trunks and branches which are reachable within arms length whether the user is on a ladder or has climbed a tree. The attempt to extend a reach can present safety hazards to the non-professional user.

SUMMARY OF THE INVENTION

This invention is an attachment to the conventional chain saw drive whereby the rotating chain saw drive operation converts the attachment to a reciprocating movement functioning to operate a saw blade longitudinally remote from the chain saw tool. This invention includes a longitudinally oblong guide bar, hereinafter also referred to as a second guide bar, formed similar in structure to the prior art chain saw guide bar, hereinafter also referred to as a first guide bar, and further provided with aperatures and holes which match the studs and bolts extending from the motor casing so that the guide bar of this invention may replace the prior art chain saw guide bar. Also provided are a sprocket wheel at the distal end of the second guide bar and an endless link chain which engages the drive sprocket in the motor casing of the chain saw at one end and at the other end loops around the teeth of the sprocket wheel positioned at the distal end of the second guide bar. The link chain travels on the edge of the second guide bar in the same fashion as the prior art chain saw travels on the edge of the first guide bar. Therefore, the sprocket wheel supported at the distal end of the second guide bar is rotated by the link chain driven by the motor drive of the chain saw. Formed in the body of the second guide bar of this invention intermediate the ends thereof is a slotted opening in which a sliding block reciprocates within the confines thereof. The sliding block is pivotly connected to the end of a crank lever, the other end of the lever is connected to a crank handle located adjacent the perimeter of the sprocket wheel or at least eccentric to the center thereof so that the sprocket wheel and crank lever moves the sliding block in piston-like fashion. The other side of the reciprocating sliding block carries an elongated rod which is supported in its longitudinal position by the longitudinally extending pole mounted on the second guide bar. A bracket may be slidably mounted on the pole at the distal end thereof to provide support for the reciprocating elongated rod at the end of the rod. A saber saw blade is connected to the distal end of the elongated reciprocating rod to perform the sawing operation longitudinally remote from the hand held motor drive of the chain saw.

These as well as other objects and advantages will become apparent upon a careful study of the following detail description of this invention when read with reference to the accompanying drawings which illustrate a preferred embodiment of this invention.

BRIEF DESCRIPTION OF THE DRAWINGS

FIG. 6 is a cross sectional view taken along lines 6—6 of FIG. 1;

FIG. 7 is a cross sectional view taken along line 7—7 of FIG. 1;

FIG. 8 is an end view of the extension attachment taken along lines 8—8 of FIG. 1;

FIG. 9 is a cross sectional view of the saber saw blade attachment taken along lines 9—9 of FIG. 4;

FIG. 10 is a side elavation of the saber saw blade for contemplated use with this invention;

FIG. 11 is a cross sectional view taken along lines 11—11 of FIG. 3 showing details of structure of the second guide bar, reciprocating slide block, block guide runners and connecting shaft for the crank lever; and FIG. 12 1s a side view of this invention shown connected to a chain saw motor drive, a part of the casing thereof removed.

DETAILED DESCRIPTION OF THE INVENTION

Figure 3:
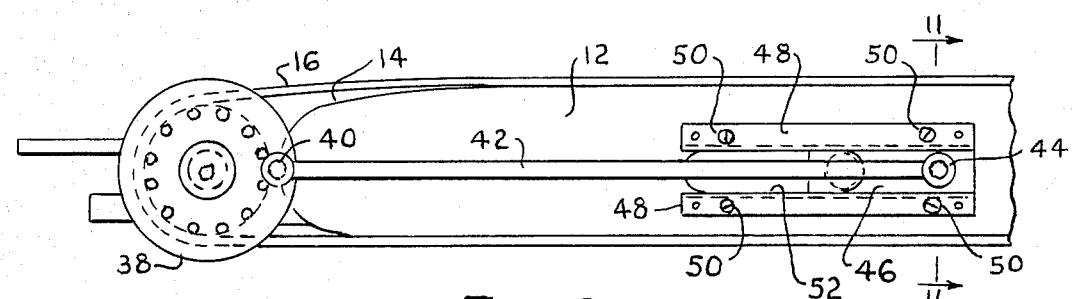
FIG. 3 is a side view of the extension attachment showing the side opposite of FIG. 1.
Figure 2:
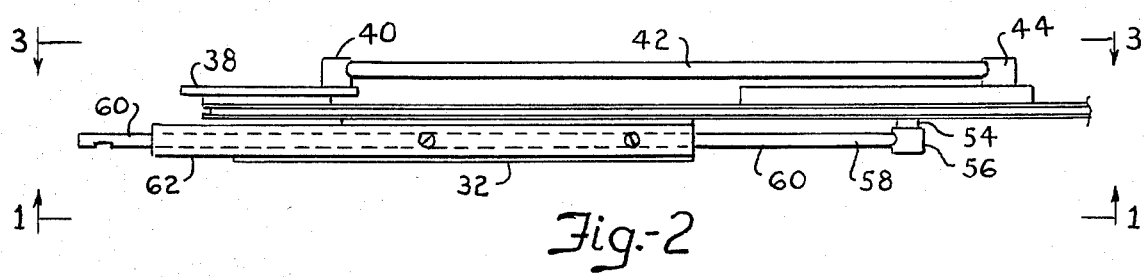
FIG. 2 is a top view thereof.
Figure 1:
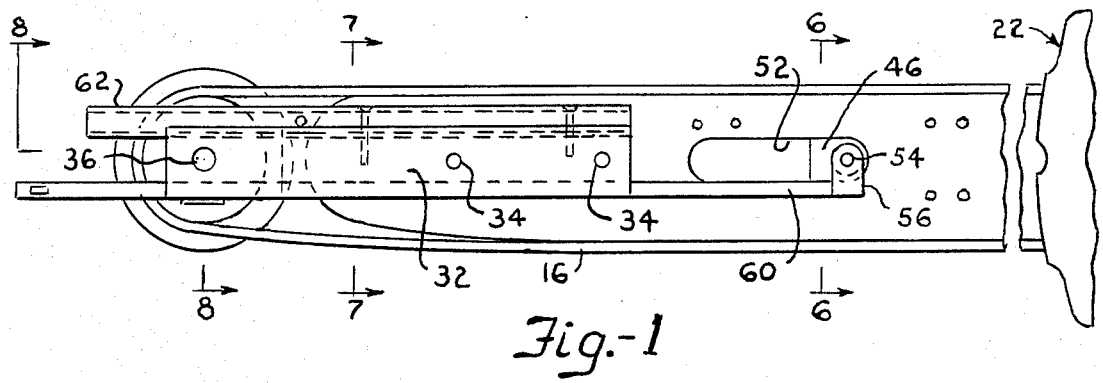
FIG. 1 is a side elevation of a part of the extension attachment of this invention.
Figure 5:
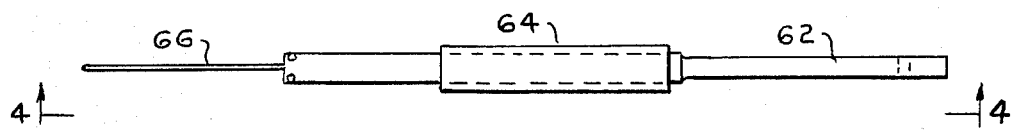
FIG. 5 is a top view of the saw attachment of FIG. 4.
Figure 4:
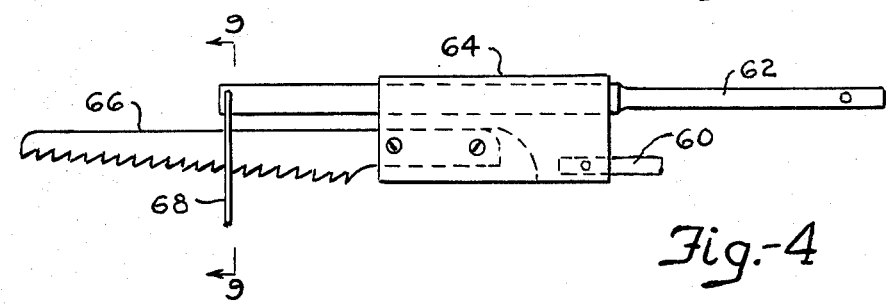
FIG. 4 is a side view of the reciprocating saber saw blade mechanism which longitudinally connects to the longitudinal support pole and reciprocating elongated rod shown in FIG. 1 to extend the attachment of FIG. 1.

Referring now more particularly to the drawing wherein is illustrated a preferred embodiment of my invention, reference numeral 10 designates generally the extension attachment of this invention. It comprises an oblong guide bar 12 having a peripheral edge 14 which serves as a track for the endless link chain 16 moveable therearound. One end of guide bar 12 is shaped as at 18 to allow the conventional operation of the clutch drive 20 of the conventional chain saw motor 22. Aperatures and holes such as 24 and 26 are provided adjacent one end thereof which are aligned with studs and bolts 28 and 30 provided on the prior art chain saw motor casing to which this invention is connected to replace the conventional chain saw guide bar. As shown in FIGS. 1 through 8 and 11, guide bar 12 of this invention is provided with a base member 32 which I show to be in the form of an elongated rectangular member mounted on the forward part of guide bar 12 by any convenient connecting means such as screws 34. The forward distal end of the base 32 is provided with a bearing mount 36 which journally carries a sprocket wheel 38 free to rotate at a position forward of the distal end of guide bar 12 and in the same plane as that of the guide bar. The endless link chain 16 carried on edge 14 of guide bar 12 loops over and engages the sprocket wheel 38 at the forward end, and sprocket drive 20 at the proximate end 18 within the casing of the chain saw motor 22, to rotate sprocket wheel 38.

One side of sprocket wheel 38 carries a wrist pin 40 to which is connected an end of crank lever 42. The other end of crank lever 42 is connected to a second wrist pin 44 which extends from sliding block 46. Sliding block 46 reciprocally slides between parallel guide runners 48 which are connected by means of screws 50 to one side of guide bar 12 straddling elongated slot 52 formed in the body of guide bar 12. Pin 54 is provided on the opposite side of sliding block 46 which extends through slotted opening 52. Pin 54 carries a link member 56 to which is connected the proximate end 58 of elongated saw rod 60. Saw rod 60 is supported by base member 32 so as to allow reciprocating sliding movement of saw rod 60. Accordingly, rotation of sprocket wheel 38 eccentrically revolves wrist pin 40 carrying with it the end of crank lever 42 connected thereto. The other end of crank lever 42 being connected to the wrist pin 44 extending from slide block 46 will cause slide block 46 to move to and fro between guide runners 48, which in turn will cause saw rod 60 to move to and fro.

The elongated pole 62 is connected to base 32 laterally spaced from and parallel to elongated saw rod 60, both of which extend forward of sprocket wheel 38. As shown in FIGS. 4, 5, 9 and 12, bracket 64 for supporting the saw rod at the distal end thereof is mounted on and depends from elongated pole 62. Saw blade 66 is fixed to the forward part thereof extending longitudinally in advance of the distal end of saw rod 60 and elongated pole 62. I provide a saw blade guard 68 connected to the distal end of elongated pole 62, depending therefrom adjacent each side of saw blade 66 to protect the saw blade for excessive side flexing. The saw blade guard 68 depends substantially below the saw teeth of the saw blade so that this part of the guard may catch or hook over the limb to be cut if so desired thereby serving to support the forward part of the elongated pole and relieve the leverage strain placed on the workman holding the chain saw motor at one end of a long lever.

In the operation of this invention, prior art chain saw 22, is converted to a reciprocating saw of my invention having the capability of operating at a position remote from the prior art chain saw by attaching device 10 of this invention. This is accomplished by removing the chain shield from the motor casing of the chain saw exposing the saw chain drive 20 and the nuts or screws connecting the chain saw guide bar to the chain saw motor casing as shown in FIG. 12. The guide bar 12 of this invention is positioned in place since the connecting elements of the second guide bar are formed substantially identical with the prior art guide bar which was removed. The prior art chain saw is replaced with sprocket chain 16 of this invention. The second guide bar is provided with holes and aperatures to receive the prior art bolt studs and pins 30, 26 and 28 by which means the end of guide bar 12 is connected to the chain saw motor casing 22 in the same manner that the prior art guide bar is connected to the motor casing. Sprocket chain 16 is looped over the drive sprocket 20 and the chain shield is then replaced. The reciprocating saw attachment 10 of this invention is thereby easily and simply connected to the motor drive and is effective to perform the cutting operation on tree limbs and other like objects distant from the position of the workman.

I claim:

1. A reciprocating saw attachment for a chain saw wherein said chain saw includes a rotating drive and a guide bar, comprising:
   a second guide bar for replacing the first mentioned guide bar, said second guide bar having an elongated aperature in the body thereof and a slide block reciprocally moveable in said aperature;
   a wheel mounted on said second guide bar, said wheel having connecting means eccentric thereof;
   a crank lever having one end thereof connected to said connecting means and the other end thereof connected to said slide block;
   an endless link means encircling said second guide bar, said rotating drive of said chain saw, and said wheel for rotating said wheel;
   an elongated rod mounted on said second guide bar for reciprocal movement thereon; and
   a saw blade connected to the distal end of said elongated rod.

2. The reciprocating saw attachment of claim 1 wherein said slide block moveable in said aperature is further characterized as being asseccable from both sides of said guide bar.

3. The reciprocating saw attachment of claim 2 wherein said crank lever and said elongated rod are further characterized as being on opposite sides of said second guide bar.

4. A reciprocating saw attachment for a chain saw wherein said chain saw includes a sprocket drive and a guide bar, comprising:
   a second guide bar for replacing the first mentioned guide bar, said second guide bar having an elongated aperature in the body thereof and a slide block reciprocally moveable in said aperature;
   a sprocket wheel mounted on said second guide bar, said sprocket wheel having connecting means adjacent the perimeter thereof;
   a crank lever having one end thereof connected to said connecting means and the other end thereof connected to said slide block;
   and endless sprocket chain encircling said second guide bar, and sprocket drive of said chain saw, and said sprocket wheel for rotating said sprocket wheel;
   an elongated rod mounted on said second guide bar for reciprocal movement thereon; and
   a saw blade connected to the distal end of said elongated rod.

5. The reciprocating saw attachment of claim 4 wherein said slide block moveable in said aperature is further characterized as being accessable from both sides of said guide bar.

6. The reciprocating saw attachment of claim 5 wherein said crank lever and said elongated rod are further characterized as being on opposite sides of said second guide bar.

7. A reciprocating saw attachment for a chain saw wherein said chain saw includes a sprocket drive and a guide bar, comprising;
   a second guide bar for replacing the first mentioned guide bar, said second guide bar having an elongated aperature in the body thereof and a slide block reciprocally moveable in said aperature;
   a sprocket wheel mounted on said second guide bar, said sprocket wheel having connecting means adjacent the perimeter thereof;
   a crank lever having one end thereof connected to said connecting means and the other end thereof connected to said slide block;
   an endless sprocket chain encircling said second guide bar, said sprdcket drive of said chain saw and said sprocket wheel mounted on said second guide bar for rotating said sprocket wheel;

an elongated pole member fixed to said second guide bar, the end thereof being longitudinally extensive of said second guide bar;

an elongated rod supported on said second guide bar for reciprocal movement thereon, one end thereof being connected to said slide block and the other end of said elongated rod being distal of said second guide bar;

a saw blade connected to the distal end of said elongated rod; and means on said elongated pole member for supporting said elongated rod.

8. The reciprocating saw attachment of claim 7 wherein said pole member and said elongated rod are further characterized as being parallel to each other.

9. The reciprocating saw attachment of claim 7 wherein said means on said elongated pole is further characterized as being adjacent the distal end thereof and slidably moveable thereon.

10. The reciprocating saw attachment of claim 7 wherein said slide block moveable in said aperature is further characterized as being accessable from both sides of said guide bar.

11. The reciprocating saw attachment of claim 7 wherein said base member and said crank lever are further characterized as being on opposite sides of said second guide bar.

12. A reciprocating saw attachment for a chain saw, comprising:

a guide bar having an elongated aperature in the body thereof and a slide block reciprocally moveable in said aperature;

a base member connected to said guide bar, the end thereof being longitudinally extensive of said guide bar;

a wheel mounted on said base member spaced forward of the end of said guide bar, said wheel having a crank pin adjacent the perimeter thereof;

a crank lever having one end thereof connected to said crank pin and the other end thereof connected to said slide block;

an endless link member encircling said guide bar and said wheel mounted on said base member for rotating said wheel;

an elongated pole member fixed to said base member, the end thereof being longitudinally extensive of said base member;

a saw bracket mounted adjacent the distal end of said pole member and being reciprocally slidable thereon;

an elongated rod supported on said base member for reciprocal movement, the distal end of said elongated rod being connected to said slide block; and a saw blade connected to said bracket, said saw blade being longitudinally extensive of said elongated pole member and said elongated rod.

13. The reciprocating saw attachment of claim 12 wherein said slide block moveable in said aperature is further characterized as being accessable from both sides of said guide bar.

14. The reciprocating saw attachment of claim 13 wherein said crank lever and said elongated rod are further characterized as being on opposite sides of said second guide bar.

* * * * *